(12) United States Patent
Liu

(10) Patent No.: US 9,007,306 B2
(45) Date of Patent: Apr. 14, 2015

(54) FOLDING ELECTRONIC APPARATUS WITH CAPACITIVE TOUCH SCREEN AND METHOD FOR DETECTING OPEN AND CLOSED MODES THEREOF

(75) Inventor: Yinong Liu, Beijing (CN)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 0 days.

(21) Appl. No.: 13/615,685

(22) Filed: Sep. 14, 2012

(65) Prior Publication Data

US 2013/0127724 A1    May 23, 2013

(30) Foreign Application Priority Data

Nov. 22, 2011   (CN) .......................... 2011 1 0374088

(51) Int. Cl.
   *H04M 1/02*    (2006.01)
   *G06F 1/16*    (2006.01)

(52) U.S. Cl.
   CPC ........... *G06F 1/1677* (2013.01); *H04M 1/0245* (2013.01); *G06F 1/1616* (2013.01); *H04M 1/0216* (2013.01); *H04M 1/0243* (2013.01)

(58) Field of Classification Search
   CPC ........... H04M 1/0216; H04M 1/0214; H04M 2250/12; H04M 2250/22; H04M 1/0243; G06F 1/1616; G06F 1/1677
   USPC ............... 345/168, 173, 174; 455/556.1, 566, 455/575.3; 324/168, 173, 174, 686, 661
   See application file for complete search history.

(56) References Cited

U.S. PATENT DOCUMENTS 8,149,000 B2 *   4/2012   Harris et al. .................. 324/661
8,212,782 B2 *   7/2012   Cho et al. ...................... 345/173

(Continued)

FOREIGN PATENT DOCUMENTS

CN    1518828    8/2004
CN    101788850  7/2010

(Continued)

OTHER PUBLICATIONS

International Search Report and Written Opinion of the International Searching Authority for corresponding International Application No. PCT/IB2012/002135 dated Feb. 6, 2013.
First Chinese Office Action issued Apr. 11, 2014 for corresponding Chinese Patent Application No. 201110374088.X dated Nov. 22, 2011.

(Continued)

*Primary Examiner* — Dwayne Bost
*Assistant Examiner* — Larry Sternbane
(74) *Attorney, Agent, or Firm* — Renner, Otto, Boisselle & Sklar, LLP

(57) ABSTRACT

The embodiments of the present invention provide a folding electronic apparatus and a method for detecting open and closed modes thereof. The folding electronic apparatus includes a body and a cover, with a keyboard being disposed on the body and a capacitive touch screen being disposed on the cover. A plurality of metal detection points is disposed on the body. A sensor connected to the capacitive touch screen senses change of a capacitance value resulting from capacitive effect between the plurality of metal detection points and the capacitive touch screen, and determines open and closed modes of the folding electronic apparatus. The embodiments of the present invention detect open and closed modes of a folding electronic apparatus using a sensor connected to a capacitive touch screen by predefining a plurality of metal detection points on a keyboard or physical structure of the folding electronic apparatus.

14 Claims, 5 Drawing Sheets

(56) References Cited

U.S. PATENT DOCUMENTS

| | | | |
|---|---|---|---|
| 8,265,717 B2 * | 9/2012 | Gorsica et al. | 455/575.3 |
| 8,515,502 B2 * | 8/2013 | Liu | 455/575.1 |
| 8,558,558 B2 * | 10/2013 | Richter | 324/675 |
| 2003/0045246 A1 | 3/2003 | Lee et al. | |
| 2004/0166829 A1 | 8/2004 | Nakae et al. | |
| 2010/0182265 A1 | 7/2010 | Kim et al. | |
| 2010/0298032 A1 | 11/2010 | Lee et al. | |
| 2011/0169754 A1 | 7/2011 | Miyazawa et al. | |
| 2011/0263300 A1 * | 10/2011 | Nishizono et al. | 455/566 |
| 2012/0206126 A1 * | 8/2012 | Froniewski et al. | 324/76.11 |

FOREIGN PATENT DOCUMENTS

| | | |
|---|---|---|
| CN | 101893914 | 11/2010 |
| CN | 102147656 | 8/2011 |
| WO | 2012/036891 A2 | 3/2012 |

OTHER PUBLICATIONS

International Preliminary Report on Patentability for corresponding International Application No. PCT/IB2012/002135 dated Jun. 5, 2014.

* cited by examiner

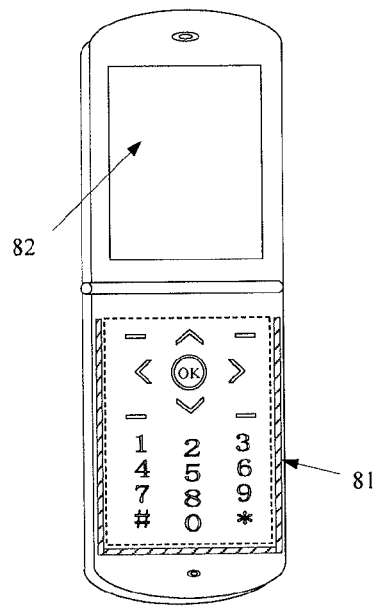

FIG. 8(a)

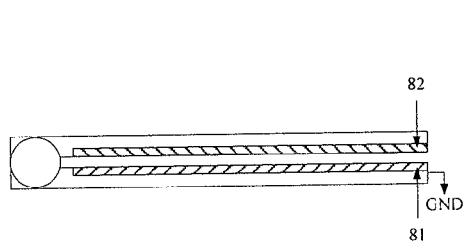

FIG. 8(b)

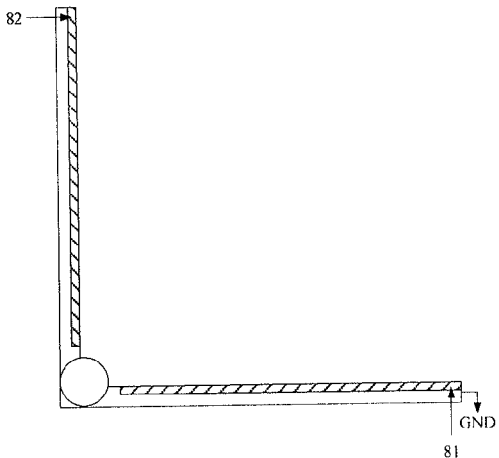

FIG. 8(c)

Sensing, by a sensor connected to the capacitive touch screen, change of a capacitance value resulted from the capacitive effect between a plurality of predefined metal detection points disposed on the body and the capacitive touch screen — 901

Determining open and closed modes of the folding electronic apparatus according to the sensed change of the capacitance value — 902

FIG. 9

FOLDING ELECTRONIC APPARATUS WITH CAPACITIVE TOUCH SCREEN AND METHOD FOR DETECTING OPEN AND CLOSED MODES THEREOF

TECHNICAL FIELD

The present invention relates to a folding electronic apparatus and in particular to a folding electronic apparatus and a method for detecting open and closed modes thereof.

BACKGROUND ART

With the rapid development of electronic technologies and communication technologies, various electronic apparatuses such as a telephone set, a computer, a personal computer, a notebook computer, a personal digital assistant (PDA), a mobile telephone (mobile phone) or other portable electronic apparatuses are frequently used in the daily life and work of the people. Among these electronic apparatuses, some are of a folding design.

FIG. 1 is a schematic diagram of a flip mobile phone, FIG. 2 is a schematic diagram of a laptop computer, and FIG. 3 is a schematic diagram of a typewriter. As shown in FIGS. 1-3, the electronic apparatuses are all of a folding design and each includes a body and a cover, with a display screen being disposed on the cover and a keyboard being disposed on the body.

SUMMARY OF THE INVENTION

As the development of technologies, capacitive touch screens will be applied to the above described folding electronic apparatuses.

In the implementation of the present invention, the inventor found that open and closed modes of the folding electronic apparatuses are usually detected by a magnetoresistive sensor or a mechanical key. With the wide use of capacitive touch screens, if open and closed modes of the folding electronic apparatuses can be detected by a capacitive touch screen, it will be advantageous for cost saving and for operation simplification.

The present invention is proposed in view of the above technical problem.

The present invention is addressed to provide a folding electronic apparatus and a method for detecting open and closed modes thereof, wherein a plurality of metal detection points are predefined on a keyboard or physical structure of the body of the folding electronic apparatus, so as to detect open and closed modes of the folding electronic apparatus by using a capacitive touch screen.

According to a first aspect of the present invention, there is provided a folding electronic apparatus, including a body and a cover, with a keyboard being disposed on the body and a capacitive touch screen being disposed on the cover; wherein a plurality of metal detection points are disposed on the body. A sensor connected to the capacitive touch screen determines open and closed modes of the folding electronic apparatus according to the sensed change of a capacitance value resulting from the capacitive effect between the plurality of metal detection points and the capacitive touch screen.

According to a second aspect of the present invention, there is provided the folding electronic apparatus as stated in the first aspect, wherein when the folding electronic apparatus is closed, the plurality of metal detection points are close to the cover, the capacitance value resulting from the capacitive effect between a first predefined number of metal detection points and the capacitive touch screen changes, and the sensor senses that the capacitance value between the first predefined number of metal detection points and the capacitive touch screen changes, and determines that the folding electronic apparatus is in a closed mode. When the folding electronic apparatus is open, the plurality of metal detection points are away from the cover, the capacitance value resulting from the capacitive effect between a second predefined number of metal detection points and the capacitive touch screen changes, and the sensor senses that the capacitance value between the second predefined number of metal detection points and the capacitive touch screen changes, and determines that the folding electronic apparatus is in an open mode; wherein the first predefined number is greater than the second predefined number.

According to a third aspect of the present invention, there is provided the folding electronic apparatus as stated in the second aspect, wherein the first predefined number is a range, and the upper limit of the range is equal to the number of the metal detection points and the second predefined number is a range, and the lower limit of the range is zero.

According to a fourth aspect of the present invention, there is provided the folding electronic apparatus as stated in the first aspect, wherein the plurality of metal detection points are disposed on the upper surface of the body, and are located at positions that are not prone to be pressed simultaneously.

According to a fifth aspect of the present invention, there is provided the folding electronic apparatus as stated in the fourth aspect, wherein the keyboard is a metal-faced keyboard, and the plurality of metal detection points are a plurality of metal detection points predefined on the metal-faced keyboard.

According to a sixth aspect of the present invention, there is provided the folding electronic apparatus as stated in the fourth aspect, wherein the folding electronic apparatus further includes a metal supporting structure disposed under the keyboard, and the plurality of metal detection points are a plurality of metal detection points predefined on the metal supporting structure.

According to a seventh aspect of the present invention, there is provided the folding electronic apparatus as stated in the fourth aspect, wherein the folding electronic apparatus further includes a metal frame disposed at the periphery of the keyboard, and the plurality of metal detection points are a plurality of metal detection points predefined on the metal frame.

According to an eighth aspect of the present invention, there is provided a method for detecting open and closed modes of a folding electronic apparatus, the folding electronic apparatus includes a body and a cover, with a keyboard being disposed on the body and a capacitive touch screen being disposed on the cover; wherein the method includes: sensing, by a sensor connected to the capacitive touch screen, change of a capacitance value resulting from the capacitive effect between a plurality of predefined metal detection points disposed on the body and the capacitive touch screen, and determining open and closed modes of the folding electronic apparatus according to the sensed change of the capacitance value.

According to a ninth aspect of the present invention, there is provided the method as stated in the eighth aspect, wherein when the folding electronic apparatus is closed, the plurality of metal detection points are close to the cover, the capacitance value resulting from the capacitive effect between a first predefined number of metal detection points and the capacitive touch screen changes, and the sensor senses that the capacitance value between the first predefined number of metal detection points and the capacitive touch screen changes, and determines that the folding electronic apparatus is in a closed mode. When the folding electronic apparatus is open, the plurality of metal detection points are away from the cover, the capacitance value resulting from the capacitive effect between a second predefined number of metal detection points and the capacitive touch screen changes, and the sensor senses that the capacitance value between the second predefined number of metal detection points and the capacitive touch screen changes, and determines that the folding electronic apparatus is in an open mode; wherein the first predefined number is greater than the second predefined number.

According to a tenth aspect of the present invention, there is provided the method as stated in the eighth aspect, wherein the first predefined number is a range, and the upper limit of the range is equal to the number of the metal detection points and the second predefined number is a range, and the lower limit of the range is zero.

The advantages of the present invention exist in detecting open and closed modes of a folding electronic apparatus using a sensor connected to a capacitive touch screen by predefining a plurality of predefined metal detection points on a keyboard or on the physical structure of the folding electronic apparatus, saving the cost of production of the folding electronic apparatus with a capacitive touch screen, and reducing the complexity of operation.

These and further aspects and features of the present invention will be apparent with reference to the following description and attached drawings.

In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary apparatus actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWINGS

The drawings are included to provide further understanding of the present invention, which constitute a part of the specification and illustrate the preferred embodiments of the present invention, and are used for setting forth the principles of the present invention together with the description. The same element is represented with the same reference number throughout the drawings.

In the drawings:

FIGS. 8(a)-8(c) are schematic diagrams of a further embodiment; and

FIG. 9 is a flowchart of the method for detecting open and closed modes of the folding electronic apparatus of an embodiment of the present invention.

DETAILED DESCRIPTION OF THE INVENTION

The interchangeable terms "electronic apparatus" and "electronic device" include portable radio communication apparatus. The term "portable radio communication apparatus", which hereinafter is referred to as a "mobile radio terminal", "portable electronic device", or "portable communication device", includes all apparatuses such as mobile telephones, pagers, communicators, electronic organizers, personal digital assistants (PDAs), smartphones, portable communication devices or the like.

In the present application, embodiments of the invention are described primarily in the context of a portable electronic device in the form of a mobile telephone (also referred to as "mobile phone"). However, it shall be appreciated that the invention is not limited to the context of a mobile telephone and may relate to any type of appropriate electronic apparatuses. Examples of such electronic apparatuses include media players, gaming equipments, PDAs and computers, digital cameras, etc.

The preferred embodiments of the present invention are described as follows with reference to the drawings.

Figure 1:
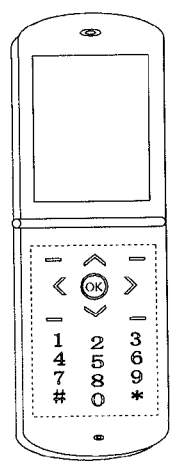
FIG. 1 is a schematic diagram of a flip mobile phone.
Figure 2:
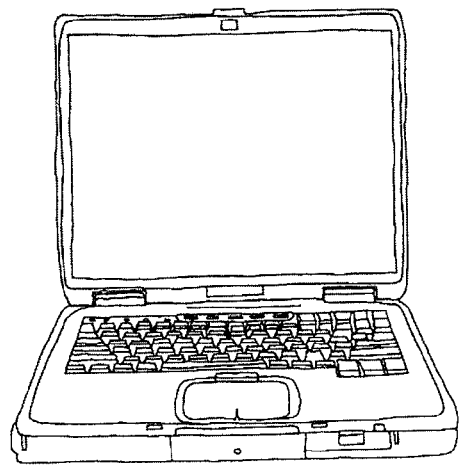
FIG. 2 is a schematic diagram of a laptop computer.
Figure 3:
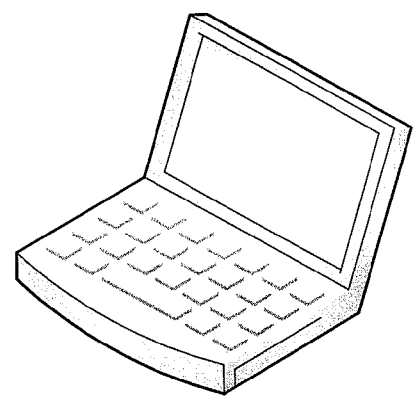
FIG. 3 is a schematic diagram of a QWERTY typewriter.
Figure 4:
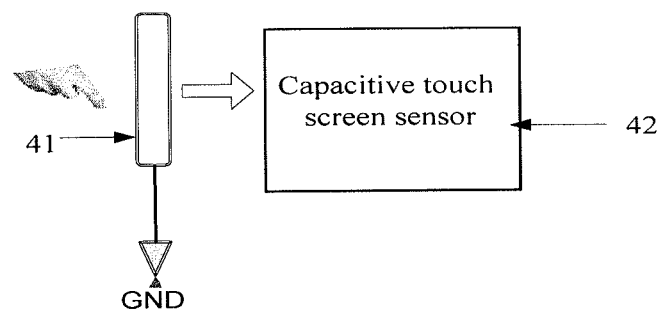
FIG. 4 is a schematic diagram of working principle of a capacitive touch screen.

FIG. 4 is a schematic diagram of working principle of a capacitive touch screen 41. As shown in FIG. 4, when a finger touches the capacitive touch screen 41, the amount of change of a capacitance value is detected by a sensor 42 connected to the capacitive touch screen, and information on the touch screen being touched and pressed is generated and provided to the central processing unit (CPU) (not shown) of the electronic apparatus provided with the capacitive touch screen 41.

On the basis of the working principle of the capacitive touch screen 41, an embodiment of the present invention provides a folding electronic apparatus as stated in embodiment 1 below.

Embodiment 1

Figure 5:
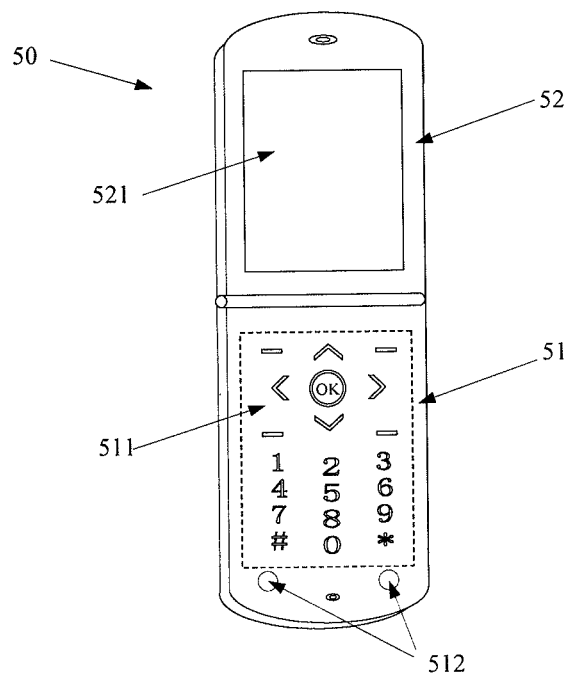
FIG. 5 is a schematic diagram of the composition of the folding electronic apparatus of an embodiment of the present invention.

An embodiment of the present invention provides a folding electronic apparatus 50. FIG. 5 is a schematic diagram of the composition of the folding electronic apparatus 50. Referring to FIG. 5, the folding electronic apparatus 50 includes a body 51 and a cover 52, with a keyboard 511 being disposed on the body 51 and a capacitive touch screen 521 being disposed on the cover 52. The capacitive touch screen 521 is connected to a capacitive sensor (not shown), and the capacitive sensor senses the change of capacitance on the capacitive touch screen 521, generates a corresponding signal and transmits the signal to the CPU of the electronic apparatus for corresponding control and process by the CPU.

In this embodiment, a plurality of metal detection points 512 is also disposed on the body 51. The plurality of metal detection points 512 may be grounded, or may be suspended. When the metal detection points 512 are grounded, capacitive effect is generated between the metal detection points and the capacitive touch screen 521 disposed on the cover, and the sensor connected to the capacitive touch screen 521 may sense the change of a capacitance value resulting from the capacitive effect between the metal detection points and the capacitive touch screen 521. When the metal detection points 512 are suspended, capacitive effect will also be generated between the metal detection points 512 and the capacitive touch screen 521 disposed on the cover if a metal object is placed or disposed on the cover, and the sensor connected to the capacitive touch screen 521 may also sense the change of the capacitance value resulting from the capacitive effect between the metal detection points and the capacitive touch screen 521.

In this embodiment, the sensor connected to the capacitive touch screen 521 is further used to sense the change of the capacitance value resulting from the capacitive effect between the plurality of metal detection points 512 and the capacitive touch screen 521, and determine open and closed modes of the folding electronic apparatus according to the sensed change of the capacitance value.

The change of the capacitance value resulting from the capacitive effect between the plurality of metal detection points and the capacitive touch screen 521 may be sensed by the sensor connected to the capacitive touch screen 521. When the electronic apparatus is in a closed mode, the plurality of metal detection points are close to the capacitive touch screen 521, and the capacitance value will change due to the capacitive effect between them, corresponding to that a plurality (a first predefined number) of points touch the capacitive touch screen simultaneously; and the sensor can sense that the capacitance value between the plurality (the first predefined number) of metal detection points and the capacitive touch screen changes, e.g., the capacitance value changes from small to large, thereby determining that the electronic apparatus is in a closed mode. When the electronic apparatus is in an open mode, the plurality of metal detection points are away from the capacitive touch screen 521, and there are few metal detection points the capacitance value between which and the capacitive touch screen resulting from capacitive effect changes. Hence, although there exists capacitive effect, the sensor cannot sense that the capacitance between the plurality of metal detection points and the capacitive touch screen changes, or can only sense that the capacitance between a few (a second predefined number) metal detection points and the capacitive touch screen changes, since there are not multiple points touch the capacitive touch screen simultaneously, thereby determining that the electronic apparatus is in the open mode.

In this embodiment, when the sensor senses that the capacitance value between the first predefined number of metal detection points and the capacitive touch screen changes, determining that the folding electronic apparatus is in the closed mode; and when the sensor senses that the capacitance value between the second predefined number of metal detection points and the capacitive touch screen changes, determining that the folding electronic apparatus is in the open mode; wherein the first predefined number is greater than the second predefined number.

In an embodiment, the first predefined number is a range, and the upper limit of the range is equal to the number of the metal detection points. The second predefined number is a range, and the lower limit of the range is zero. The first predefined number being greater than the second predefined number means that the lower limit of the first predefined number is greater than the upper limit of the second predefined number.

For example, assuming that 100 metal detection points are predefined on the body of the folding electronic apparatus, the first predefined number is 80-100, and the second predefined number is 0-5, then when the sensor detects that the capacitance of 90 metal detection points changes, it determines that the folding electronic apparatus is in the closed mode and when the sensor senses that the capacitance of 2 metal detection points changes, it determines that the folding electronic apparatus is in the open mode.

In another embodiment, the first predefined number and the second predefined number are ratios of the total number of the metal detection points, respectively. For example, the first predefined number is 90% of the total number, and the second predefined number is 5% of the total number. In a further embodiment, the first predefined number and the second predefined number may also be ranges of ratios of the total number of the metal detection points, respectively. For example, the first predefined number is 90%-100% of the total number, and the second predefined number is 0-5% of the total number.

In this embodiment, the plurality of metal detection points 512 is disposed on the upper surface of the body, and is located at positions that are not prone to be pressed simultaneously. If the plurality of metal detection points 512 are located at positions that are prone to be pressed simultaneously, when a user touches the positions on the capacitive touch screen 521 to which these metal detection points corresponds through the capacitive touch screen, the sensor connected to the capacitive touch screen 521 will detect the plurality of positions and will consider that a case similar to a plurality of metal detection points being touched simultaneously has occured, and determine by mistake that the folding electronic apparatus is in the closed mode.

In this embodiment, the disposal positions of the plurality of metal detection points are predefined. In an ordinary process of using the folding electronic apparatus, it is ensured that the positions on the capacitive touch screen to which these metal detection points correspond are seldom pressed by the user simultaneously, and when the changes of the capacitance value of most of the metal detection points are sensed to be similar, the closed mode of the folding electronic apparatus will be detected.

In an embodiment, the keyboard of the electronic apparatus is a metal-faced keyboard, and the plurality of metal detection points may be a plurality of metal detection points predefined on the metal-faced keyboard. In another embodiment, the keyboard of the electronic apparatus is not a metal-faced keyboard, and it is possible to dispose a plurality of metal detection points by disposing a metal supporting structure under the keyboard and predefining the plurality of metal detection points on the metal supporting structure. In a further embodiment, the keyboard of the electronic apparatus is not a metal-faced keyboard, and it is possible to dispose a plurality of metal detection points by disposing a metal frame at the periphery of the keyboard and predefining the plurality of metal detection points on the metal frame. When the positions of a plurality of metal detection points are predefined, the positions on the capacitive touch screen to which the plurality of metal detection points correspond are also determined, and the sensor connected to the capacitive touch screen may determine open and closed modes of the folding electronic apparatus according to detection of the change of capacitance values of the positions on the capacitive touch screen corresponding to the plurality of metal detection points.

For the clarity of the above embodiments, explanations are given below with reference to the drawings. In the embodiments below, the metal detection points being grounded are taken as an example. However, as stated above, the embodiments are not limited thereto, and the metal detection points may also be suspended as long as it is ensured that the capacitive effect is generated between the metal detection points and the touch screen, which is also covered by the protection scope of the present invention.

Figure 6A:
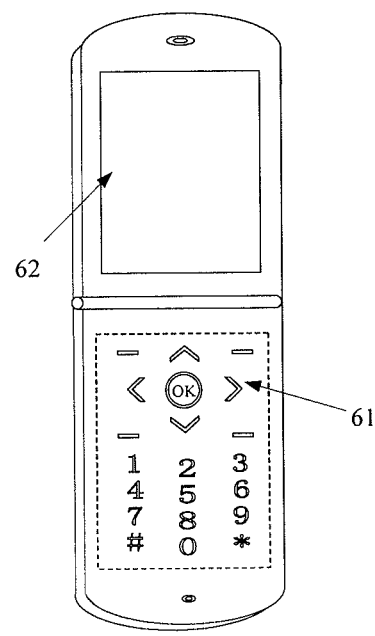
FIGS. 6(a)-6(c) are schematic diagrams of an embodiment.
Figures 6B, 6C:
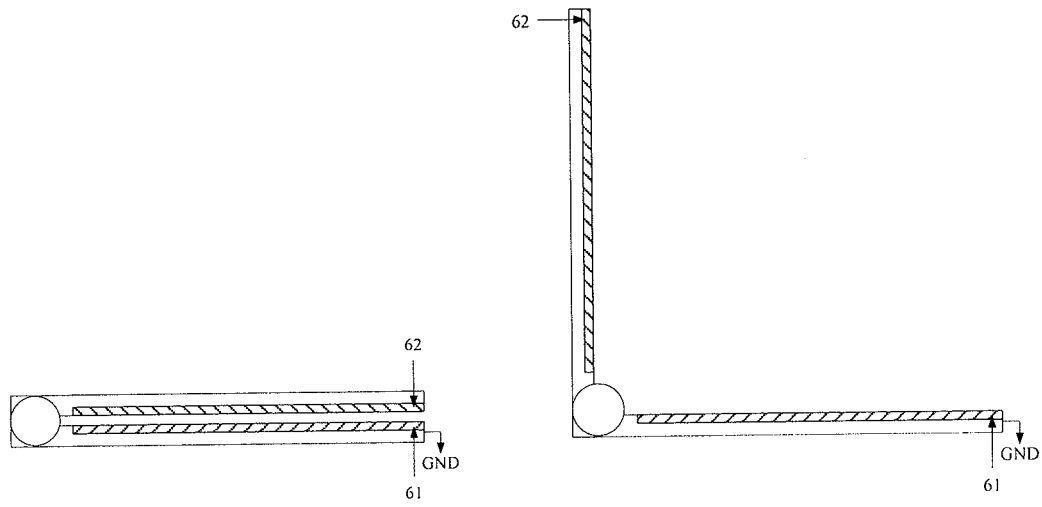

FIGS. 6(a)-6(c) are schematic diagrams of a folding electronic apparatus of an embodiment of the present invention. Referring to FIGS. 6(a)-6(c), in this embodiment, the keyboard of the folding electronic apparatus is a metal-faced keyboard, and some points may be predefined on the metal-faced keyboard as metal detection points, so that the sensor connected to the capacitive touch screen determines open and closed modes of the folding electronic apparatus according to the sensed change of a capacitance value resulting from the capacitive effect between these metal detection points and the capacitive touch screen.

As shown in FIG. 6(a), some points are predefined on the metal-faced keyboard 61 of the folding electronic apparatus as metal detection points, and the sensor connected to the capacitive touch screen 62 of the folding electronic apparatus senses the change of capacitance value between these metal detection points and the capacitive touch screen 62 under the control of the CPU of the folding electronic apparatus.

When the folding electronic apparatus is in a closed mode, as shown in FIG. 6(b), since the metal-faced keyboard 61 is grounded, the plurality of metal detection points predefined on the metal-faced keyboard 61 are also grounded, and capacitive effect is generated between the plurality of metal detection points and the capacitive touch screen 62. Hence, since these metal detection points are close to the capacitive touch screen 62, the capacitance value resulting from the capacitive effect between these metal detection points and the capacitive touch screen 62 changes from small to large, and the sensor connected to the capacitive touch screen 62 can sense that the capacitance value of the positions on the capacitive touch screen corresponding to these metal detection points changes, which is similar to sensing that a plurality of points touch the capacitive touch screen 62 simultaneously, and determine that the folding electronic apparatus is in the closed mode.

When the folding electronic apparatus is in an open mode, as shown in FIG. 6(c), although the metal detection points on the metal-faced keyboard 61 are still grounded, and capacitive effect is still generated between these metal detection points and the capacitive touch screen 62, since the cover is open and these metal detection points are away from the capacitive touch screen 62, the sensor connected to the capacitive touch screen 62 cannot sense that the capacitance value of the positions on the capacitive touch screen 62 corresponding to these metal detection points changes, or can only sense that the capacitance value of the positions on the capacitive touch screen 62 corresponding to few metal detection points changes (for example, the change of the capacitance value of the positions on the capacitive touch screen corresponding to the metal detection points close to the capacitive touch screen is possibly sensed), since most of the metal detection points no longer "touch" the capacitive touch screen 62, the sensor may determine that the folding electronic apparatus is in the open mode.

The plurality of metal detection points predefined on the metal keyboard may form some predefined shapes, so that the sensor connected to the capacitive touch screen determines open and closed modes of the folding electronic apparatus according to the sensed shape. For example, a plurality of metal detection points is predefined on the metal keyboard so that these metal detection points form a circle. When the folding electronic apparatus is closed, the sensor connected to the capacitive touch screen can sense a "touch" of a circle, thereby determining that the folding electronic apparatus is in the closed mode and when the folding electronic apparatus is open, the sensor connected to the capacitive touch screen cannot sense a "touch" of a circle, thereby determining that the folding electronic apparatus is in the open mode.

Therefore, the open or closed mode of the folding electronic apparatus may be determined by sensing the change of capacitance value of the positions on the capacitive touch screen to which a plurality of metal detection points predefined on the metal-faced keyboard correspond by the sensor connected to the capacitive touch screen.

Figure 7A:
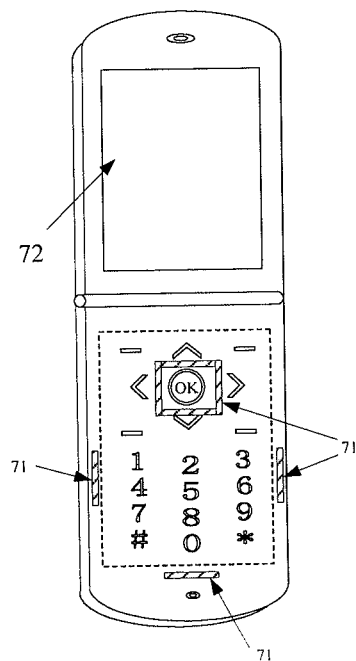
FIGS. 7(a)-7(c) are schematic diagrams of another embodiment.
Figures 7B, 7C:
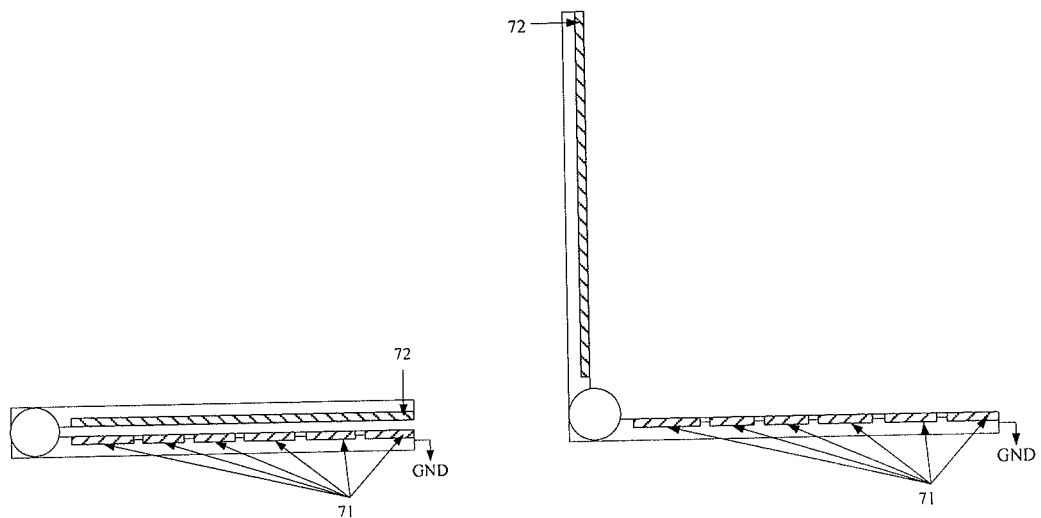

FIGS. 7(a)-7(c) are schematic diagrams of a folding electronic apparatus of another embodiment of the present invention. Referring to FIGS. 7(a)-7(c), in this embodiment, the keyboard of the folding electronic apparatus is not a metal-faced keyboard. Thus, a metal supporting structure 71 is disposed under the keyboard in this embodiment. The keyboard is supported by the metal supporting structure 71 on one hand and on the other hand, some points are predefined on the metal supporting structure as metal detection points, so that a sensor connected to the capacitive touch screen determines open and closed modes of the folding electronic apparatus according to the sensed change of the capacitance value resulting from capacitive effect between these metal detection points and the capacitive touch screen.

As shown in FIG. 7(a), since the metal supporting structure is needed to support the keyboard, the metal supporting structure may be designed as being distributed uniformly under the keyboard depending on actual process requirement. However, this embodiment is not limited thereto. For example, the metal supporting structure may be disposed at upper, intermediate and lower positions under the keyboard, or left, intermediate and right positions under the keyboard, or positions from left upper to right lower, or from right upper to left lower under the keyboard. Likewise, some points are predefined on the metal supporting structure 71 of the folding electronic apparatus as metal detection points, and the sensor connected to the capacitive touch screen 72 of the folding electronic apparatus senses the change of capacitance value resulting from capacitance effect between these metal detection points and the capacitive touch screen 72 under the control of the CPU of the folding electronic apparatus.

When the folding electronic apparatus is in a closed mode, as shown in FIG. 7(b), since the metal supporting structure 71 is grounded, the plurality of metal detection points predefined on the metal supporting structure 71 are also grounded, and capacitive effect is generated between these metal detection points and the capacitive touch screen 72. Hence, since these metal detection points are close to the capacitive touch screen 72, the capacitance value resulting from the capacitive effect between these metal detection points and the capacitive touch screen 72 changes from small to large, and the sensor connected to the capacitive touch screen 72 can sense that the capacitance value of the positions on the capacitive touch screen 72 corresponding to these metal detection points changes, which is similar to sensing that a plurality of points touch the capacitive touch screen simultaneously, and determine that the folding electronic apparatus is in the closed mode.

When the folding electronic apparatus is in an open mode, as shown in FIG. 7(c), although the metal detection points on the metal supporting structure 71 are still grounded and capacitive effect is still generated between these metal detection points and the capacitive touch screen 72, since the cover is open and these metal detection points are away from the capacitive touch screen 72, the sensor connected to the capacitive touch screen 72 cannot sense that the capacitance value of the positions on the capacitive touch screen 72 corresponding to these metal detection points changes, or can only sense that the capacitance value of the positions on the capacitive touch screen 72 corresponding to few metal detection points changes(for example, the change of the capacitance value of the positions on the capacitive touch screen corresponding to the metal detection points close to the capacitive touch screen is possibly sensed), since most of the metal detection points no longer "touch" the capacitive touch screen, the sensor may determine that the folding electronic apparatus is in the open mode.

The plurality of metal detection points predefined on the metal supporting structure may also form some predefined shapes, preferably the shape of the metal supporting structure. For example, if the metal supporting structure is "X" shaped, one or more points as metal detection points may be predefined on the two lines of "X" at a predefined spacing, and these metal detection points form an "X" shape. In this way, a sensor connected to the capacitive touch screen 72 determines open and closed modes of the folding electronic apparatus according to the sensed shape.

Therefore, the open or closed mode of the folding electronic apparatus may be determined by sensing the change of capacitance value resulting from capacitance effect between the metal detection points on the metal supporting structure and the capacitive touch screen 72 by the sensor connected to the capacitive touch screen.

FIGS. 8(a)-8(c) are schematic diagrams of a folding electronic apparatus of a further embodiment of the present invention. Referring to FIGS. 8(a)-8(c), in this embodiment, the keyboard of the folding electronic apparatus is not a metal-faced keyboard. A metal frame 81 is disposed at the periphery of the keyboard in this embodiment, and some metal detection points are predefined on the metal frame, so that a sensor connected to the capacitive touch screen 82 determines open and closed modes of the folding electronic apparatus according to the sensed change of the capacitance value between these metal detection points and the capacitive touch screen 82 resulting from capacitive effect.

As shown in FIG. 8(a), in this example, the metal frame 81 is disposed at the outside of three sides except a side of the keyboard adjacent to the capacitive touch screen, and some points are predefined on the metal frame 81 as metal detection points. The sensor connected to the capacitive touch screen 82 of the folding electronic apparatus senses the change of capacitance value resulting from capacitance effect between these metal detection points and the capacitive touch screen 82 under the control of the CPU of the folding electronic apparatus. The reason that the metal frame 81 is not disposed at the side of the keyboard adjacent to the capacitive touch screen 82 is for the consideration that if the metal frame is disposed at such a position, when the folding electronic apparatus is open, the capacitance value between the metal detection points on the metal frame positioned at that position and the capacitive touch screen 82 will still change due to capacitance effect, resulting in that the detection of open and closed modes of the folding electronic apparatus is inaccurate.

When the folding electronic apparatus is in a closed mode, as shown in FIG. 8(b), since the metal frame 81 is grounded, the plurality of metal detection points predefined on the metal frame 81 are also grounded, and capacitive effect is generated between these metal detection points and the capacitive touch screen 82. Hence, since these metal detection points are close to the capacitive touch screen 82, the capacitance value resulting from the capacitive effect between these metal detection points and the capacitive touch screen 82 changes from small to large, and the sensor connected to the capacitive touch screen 82 can sense that the capacitance value of the positions on the capacitive touch screen 82 corresponding to these metal detection points changes, which is similar to sensing that a plurality of points touch the capacitive touch screen simultaneously, and determine that the folding electronic apparatus is in the closed mode.

When the folding electronic apparatus is in an open mode, as shown in FIG. 8(c), although the metal detection points on the metal frame 81 are still grounded, and capacitive effect is still generated between these metal detection points and the capacitive touch screen 82, since the cover is open and these metal detection points are away from the capacitive touch screen 82, the sensor connected to the capacitive touch screen cannot sense that the capacitance value of the positions on the capacitive touch screen 82 corresponding to these metal detection points changes, or can only sense that the capacitance value of the positions on the capacitive touch screen 82 corresponding to few metal detection points changes(for example, the change of the capacitance value of the positions on the capacitive touch screen corresponding to the metal detection points close to the capacitive touch screen is possibly sensed), since most of the metal detection points no longer "touch" the capacitive touch screen, the sensor may determine that the folding electronic apparatus is in the open mode.

The plurality of metal detection points predefined on the metal frame may also form some predefined shapes, preferably the shape of the metal frame. For example, in this embodiment, the metal frame is "U" shaped, then one or more points as metal detection points may be predefined on the three lines of the metal frame at a predefined spacing, and these metal detection points also form an "U" shape. In this way, a sensor connected to the capacitive touch screen 82 determines open and closed modes of the folding electronic apparatus according to the sensed shape.

Therefore, the open or closed mode of the folding electronic apparatus may be determined by sensing the change of capacitance value resulting from capacitance effect between the metal detection points on the metal supporting structure and the capacitive touch screen by the sensor of the capacitive touch screen.

With the folding electronic apparatus of this embodiment, if only the sensor connected to the capacitive touch screen of the folding electronic apparatus is used, the objective of sensing open and closed modes of the folding electronic apparatus may be realized, which saves cost and simplifies the complexity of operation relative to the existing folding electronic apparatus, which needs a magnetoresistive sensor or mechanical key to be additionally disposed to detect open and closed modes of the folding electronic apparatus.

An embodiment of the present invention further provides a method for detecting open and closed modes of a folding electronic apparatus as stated in embodiment 2 below. Since the principle of the method for solving problems is similar to that of the folding electronic apparatus of embodiment 1, the detailed implementation in embodiment 1 may be referred to in this embodiment, and the repeated parts shall not be described further.

Embodiment 2

An embodiment of the present invention provides a method for detecting open and closed modes of a folding electronic apparatus, the folding electronic apparatus includes a body and a cover, with a keyboard being disposed on the body, and a capacitive touch screen being disposed on the cover; the capacitive touch screen is connected to a sensor, and the information corresponding to a touch is transmitted to the CPU of the folding electronic apparatus by the sensor. FIG. 9 is a flowchart of the method. Referring to FIG. 9, the method includes:

step 901: sensing, by a sensor connected to the capacitive touch screen, change of a capacitance value resulting from the capacitive effect between a plurality of predefined metal detection points disposed on the body and the capacitive touch screen, and step 902: determining open and closed modes of the folding electronic apparatus according to the sensed change of the capacitance value.

In this embodiment, when the folding electronic apparatus is closed, the plurality of metal detection points are close to the cover, the capacitance value resulting from the capacitive effect between a first predefined number of metal detection points and the capacitive touch screen changes, and the sensor senses change of the capacitance value between the first predefined number of metal detection points and the capacitive touch screen, and determines that the folding electronic apparatus is in a closed mode. When the folding electronic apparatus is open, the plurality of metal detection points are away from the cover, the capacitance value resulting from the capacitive effect between a second predefined number of metal detection points and the capacitive touch screen changes, and the sensor senses change of the capacitance value between the second predefined number of metal detection points and the capacitive touch screen, and determines that the folding electronic apparatus is in an open mode; wherein the first predefined number is greater than the second predefined number.

Preferably, the first predefined number is a range, and the upper limit of the range is equal to the number of the metal detection points and the second predefined number is a range, and the lower limit of the range is zero.

In this embodiment, the plurality of metal detection points is disposed on the upper surface of the body, and is located at positions, which are not prone to be pressed simultaneously.

In an embodiment, the keyboard is a metal-faced keyboard, and the plurality of metal detection points are a plurality of metal detection points predefined on the metal-faced keyboard.

In another embodiment, the folding electronic apparatus further includes a metal supporting structure disposed under the keyboard, and the plurality of metal detection points are a plurality of metal detection points predefined on the metal supporting structure.

In a further embodiment, the folding electronic apparatus further includes a metal frame disposed at the periphery of the keyboard, and the plurality of metal detection points are a plurality of metal detection points predefined on the metal frame.

The embodiments of the present invention detect open and closed modes of a folding electronic apparatus using a sensor connected to a capacitive touch screen by predefining a plurality of metal detection points on a keyboard or physical structure of the folding electronic apparatus, saving the cost of production of the folding electronic apparatus with a capacitive touch screen, and reducing the complexity of operation.

The preferred embodiments of the present invention are described above with reference to the drawings. Many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present invention include other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus. As used herein, "a computer readable medium" can be any device that can contain, store, communicate with, propagate or transmit programs for use by an instruction executing system, device or apparatus, or can be used in connection with the instruction executing system, device or apparatus. A computer readable medium may be, for example, but not limited to, a electronic, magnetic, optical, electromagnetic, infrared or semiconductor system, device, apparatus, or a propagation medium. More particular examples (inexhaustive lists) of a computer readable medium may include the following: an electrical connecting portion (electronic device) having one or more wirings, a portable computer hardware box (magnetic device), a random access memory (RAM) (electronic device), a read-only memory (ROM) (electronic device), an erasable programmable read-only memory (EPROM or flash memory) (electronic device), an optical fiber (optical device), and a portable compact disk read-only memory (CDROM) (optical device). Furthermore, a computer readable medium may be paper or other appropriate media on which the programs may be printed, as the programs may be obtained electronically through scanning optically the paper or other appropriate media and then compiling, interpreting, or processing in other appropriate manners, as necessary, and then the programs are stored in the computer memory.

The above literal description and drawings show various features of the present invention. It should be understood that those skilled in the art may prepare suitable computer codes to carry out each of the steps and processes described above and illustrated in the drawings. It should also be understood that the above-described terminals, computers, servers, and networks, etc. may be any type, and the computer codes may be prepared according to the disclosure contained herein to carry out the present invention by using the devices.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although a particular feature of the present invention is described with respect to only one or more of the illustrated embodiments, such a feature may be combined with one or more other features of other embodiments as desired and in consideration of advantageous aspects of any given or particular application.

The invention claimed is:

1. A folding electronic apparatus, comprising a body and a cover, with a keyboard being disposed on the body and a capacitive touch screen being disposed on the cover, wherein
   a plurality of physically separate, spaced apart metal detection points are disposed on the body; and
   a sensor connected to the capacitive touch screen on the cover determines open and closed modes of the folding electronic apparatus according to the sensed change of a capacitance value resulting from the capacitive effect between the plurality of metal detection points and the capacitive touch screen,
   wherein when the folding electronic apparatus is closed, the plurality of metal detection points are close to the cover, the capacitance value resulting from the capacitive effect between a first predefined number of metal detection points and the capacitive touch screen changes, and the sensor senses that the capacitance value between the first predefined number of metal detection points and the capacitive touch screen changes, and determines that the folding electronic apparatus is in a closed mode;
   wherein when the folding electronic apparatus is open, the plurality of metal detection points are away from the cover, the capacitance value resulting from the capacitive effect between a second predefined number of metal detection points and the capacitive touch screen changes, and the sensor senses that the capacitance value between the second predefined number of metal detection points and the capacitive touch screen changes, and determines that the folding electronic apparatus is in an open mode;
   wherein the first predefined number is greater than the second predefined number;
   wherein the first predefined number defines a range, and the upper limit of the range is equal to the number of the metal detection points; and
   wherein the second predefined number defines a range, and the lower limit of the range is zero.

2. The folding electronic apparatus according to claim 1, wherein the plurality of metal detection points are disposed on the upper surface of the body, and are located at positions that are not prone to be pressed simultaneously.

3. The folding electronic apparatus according to claim 2, wherein the keyboard is a metal-faced keyboard, and the plurality of metal detection points are a plurality of metal detection points predefined on the metal-faced keyboard.

4. The folding electronic apparatus according to claim 2, wherein the folding electronic apparatus further comprises a metal supporting structure disposed under the keyboard, and the plurality of metal detection points are a plurality of metal detection points predefined on the metal supporting structure.

5. The folding electronic apparatus according to claim 2, wherein the folding electronic apparatus further comprises a metal frame disposed at the periphery of the keyboard, and the plurality of metal detection points are a plurality of metal detection points predefined on the metal frame.

6. The folding electronic apparatus of claim 1, wherein the keyboard is a metal-faced keyboard, and the plurality of metal detection points are a plurality of metal detection points predefined on the metal-faced keyboard.

7. The folding electronic apparatus of claim 1, wherein the plurality of metal detection points forms a predetermined shape.

8. The folding electronic apparatus of claim 7, wherein the predetermined shape is an "X".

9. The folding electronic apparatus of claim 7, wherein the predetermined shape is a "U".

10. The folding electronic apparatus of claim 7, wherein the predetermined shape is a circle.

11. The folding electronic apparatus according to claim 1, wherein the folding electronic apparatus further comprises a metal supporting structure disposed under the keyboard and supporting the keyboard, and wherein the plurality of metal detection points forms a predetermined shape, and wherein the predetermined shape is the shape of the metal supporting structure.

12. A method for detecting open and closed modes of a folding electronic apparatus, the folding electronic apparatus comprising a body and a cover, with a keyboard being disposed on the body and a capacitive touch screen being disposed on the cover; wherein the method comprises:
   sensing, by a sensor connected to the capacitive touch screen, change of a capacitance value resulting from the capacitive effect between a plurality of physically separate, spaced apart predefined metal detection points disposed on the body and the capacitive touch screen; and determining open and closed modes of the folding electronic apparatus according to the sensed change of the capacitance value, wherein when the folding electronic apparatus is closed, the plurality of metal detection points are close to the cover, the capacitance value resulting from the capacitive effect between a first predefined number of metal detection points and the capacitive touch screen changes, and the sensor senses that the capacitance value between the first predefined number of metal detection points and the capacitive touch screen changes, and determines that the folding electronic apparatus is in a closed mode;

wherein when the folding electronic apparatus is open, the plurality of metal detection points are away from the cover, the capacitance value resulting from the capacitive effect between a second predefined number of metal detection points and the capacitive touch screen changes, and the sensor senses that the capacitance value between the second predefined number of metal detection points and the capacitive touch screen changes, and determines that the folding electronic apparatus is in an open mode;

wherein the first predefined number is greater than the second predefined number;

wherein the first predefined number defines a range, and the upper limit of the range is equal to the number of the metal detection points; and wherein the second predefined number defines a range, and the lower limit of the range is zero.

13. A folding electronic apparatus, comprising a body and a cover, with a keyboard being disposed on the body and a capacitive touch screen being disposed on the cover, wherein a plurality of metal detection points are disposed on an upper surface of the body and are located at positions that are not prone to be pressed simultaneously; and a sensor connected to the capacitive touch screen on the cover determines open and closed modes of the folding electronic apparatus according to the sensed change of a capacitance value resulting from the capacitive effect between the plurality of metal detection points and the capacitive touch screen, wherein the keyboard is a metal-faced keyboard, and the plurality of metal detection points are a plurality of metal detection points predefined on the metal-faced keyboard.

14. A folding electronic apparatus, comprising a body and a cover, with a keyboard being disposed on the body and a capacitive touch screen being disposed on the cover, wherein a plurality of physically separate, spaced apart metal detection points are disposed on the body; and a sensor connected to the capacitive touch screen on the cover determines open and closed modes of the folding electronic apparatus according to the sensed change of a capacitance value resulting from the capacitive effect between the plurality of metal detection points and the capacitive touch screen, wherein the keyboard is a metal-faced keyboard, and the plurality of metal detection points are a plurality of metal detection points predefined on the metal-faced keyboard.

* * * * *